United States Patent [19]
Davis

[11] 3,918,994
[45] Nov. 11, 1975

[54] BATTERY PLATE RETAINER MAT AND METHOD OF MANUFACTURE

[75] Inventor: Lyman Clifford Davis, Fort Saskatchewan, Canada

[73] Assignee: Johns-Manville Corporation, Denver, Colo.

[22] Filed: Nov. 28, 1973

[21] Appl. No.: 419,824

[52] U.S. Cl. ............... 136/145; 136/146; 136/148
[51] Int. Cl.² ........................................... H01M 2/14
[58] Field of Search ............... 136/145, 146, 148; 156/62.8, 93; 162/132; 19/156.3; 28/77

[56] References Cited
UNITED STATES PATENTS

| | | | |
|---|---|---|---|
| 2,925,456 | 2/1960 | Beusker et al. | 136/145 |
| 3,014,085 | 12/1961 | Bachman | 136/145 |
| 3,022,366 | 2/1962 | Kilroy | 136/146 X |
| 3,085,126 | 4/1963 | Labino | 162/135 X |
| 3,235,913 | 2/1966 | Schuller | 19/156.3 |
| 3,238,056 | 3/1966 | Pall et al. | 136/145 X |
| 3,647,591 | 3/1972 | Morris | 156/62.8 |
| 3,718,954 | 3/1973 | Philipps | 28/77 |
| 3,766,106 | 10/1973 | Yurimoto et al. | 136/146 X |

Primary Examiner—Winston A. Douglas
Assistant Examiner—John F. Neibling
Attorney, Agent, or Firm—Robert M. Krone; John H. Miller

[57] ABSTRACT

An improved battery plate retainer mat or separator is disclosed comprising a layer of silver attached at selective points to a fibrous layer containing a resin binder. Preferably, the sliver layer is attached to the resin bonded fibrous layer with stitching which is dissolved by the electrolyte in the battery, but the layers may also be attached with an inert stitching or with either spots or strips of a soluble or inert adhesive. An economical method of making the product is also disclosed.

28 Claims, 6 Drawing Figures

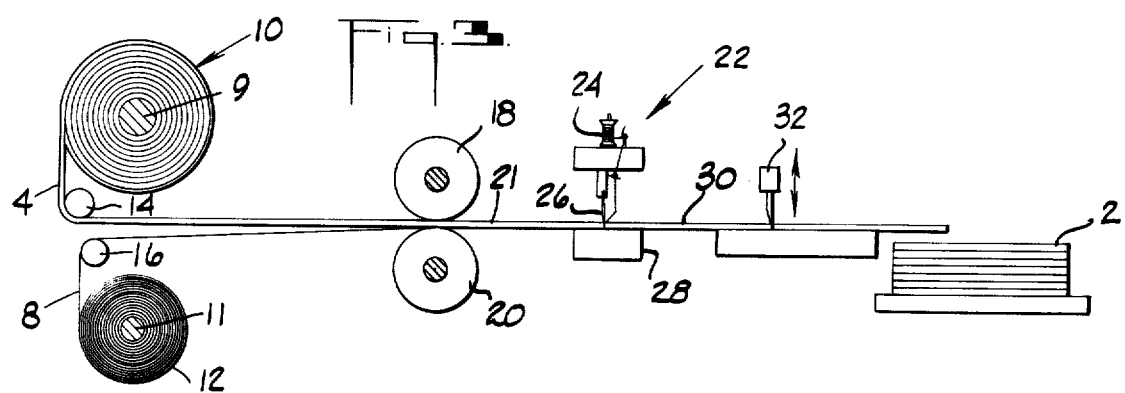
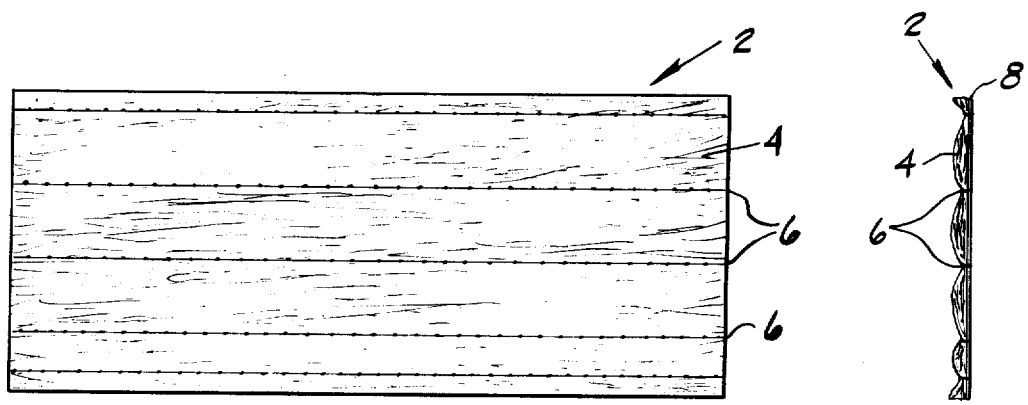
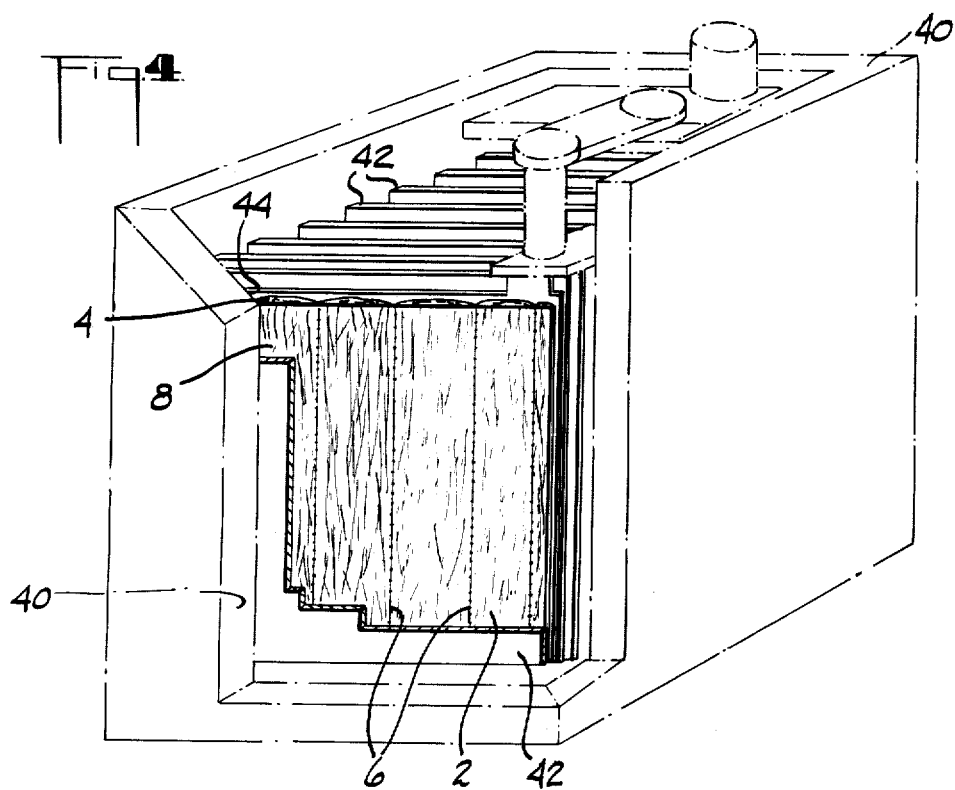

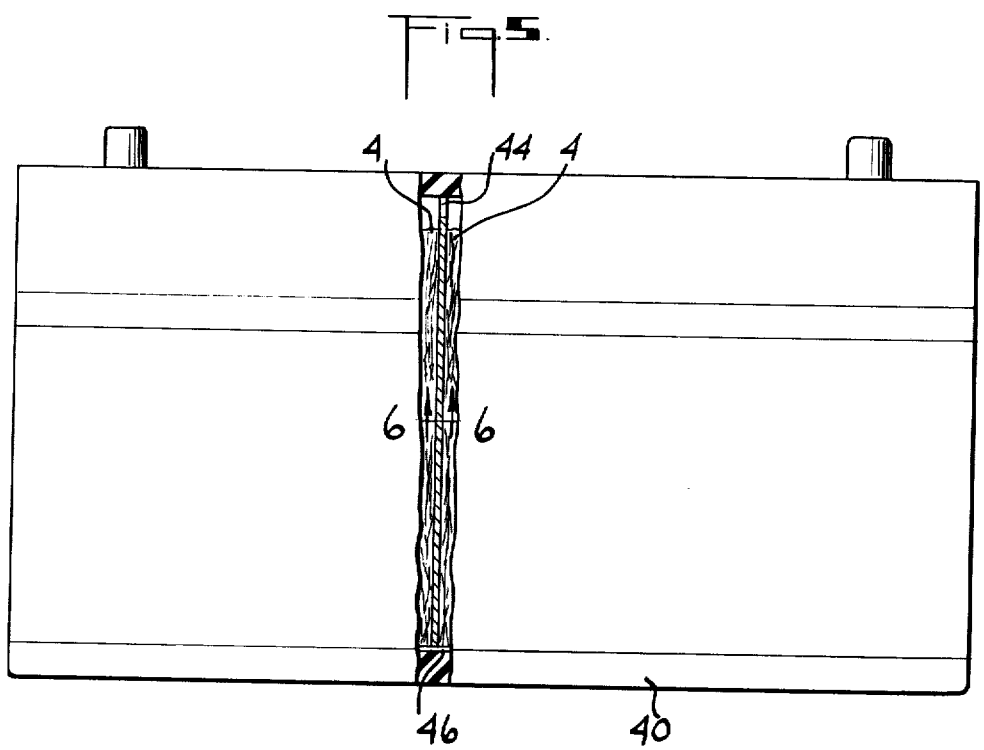
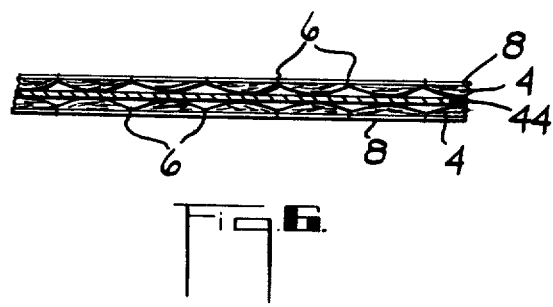

BATTERY PLATE RETAINER MAT AND METHOD OF MANUFACTURE

This invention relates to a fibrous laminate useful as a retainer mat or separator in electric storage batteries and a method of making said laminate.

BACKGROUND OF THE INVENTION

Battery plate retainer mats or separators function to retain battery paste onto the plates in a battery and also to prevent bridging of metallic deposits between the plates which would short out the battery. A battery retainer mat or separator should be permeable to the electrolyte in the battery but impermeable to small solid particles that frequently are present in the electrolyte of a functioning battery. The retainer mat or separator should not react in a detrimental manner with the electrolyte which, in most cases, is acidic.

Many types of battery separators have been proposed. One type is disclosed in U.S. Pat. No. 3,085,126 and consists of a plurality of short glass fibers of varying diameters and lengths bonded together with a combination of either colloidal alumina or colloidal silica and a thermoplastic binder.

It is also known to use a fiberglass mat of the type disclosed in U.S. Pat. No. 3,235,913 as a battery plate separator. In this disclosure a fiberglass mat made up of a plurality of layers of mechanically drawn glass fibers having diameters of about 14 microns and bonded together with a binder is used as a battery plate separator. A typical separator mat is about 0.4 millimeters thick and weighs approximately 46 to 48 grams per square meter. When using this type of mat to separate the plates of a battery it is customary to also use a resin-impregnated ribbed paper separator between the plates. This additional paper separator represents an added expense, the elimination of which would be desirable.

More recently a battery separator has been developed which does not require the resin-impregnated ribbed paper insert between the plates. This recently developed separator is a laminate comprising a fiberglass mat, such as the mat described in U.S. Pat. No. 3,235,913 discussed above, having bonded thereto a layer comprised of narrow strips of sliver in a side-by-side relationship using a resin adhesive. The sliver is a plurality of very small diameter glass fibers matted together and containing a small amount of an antistatic agent such as mineral oil. The sliver strips used in this separator are very narrow, for example one-fourth to three-eighths inch wide, and therefore the task of bonding a continuous layer comprising said strips to the fiberglass mat base is both tedious and expensive.

The object of the present invention is to provide a battery separator that does not require additional separators such as resin-impregnated ribbed paper inserts and a separator that can be economically produced. A further object of the present invention is to provide a more efficient method of making a suitable battery separator.

BRIEF SUMMARY OF THE INVENTION

Accordingly, the present invention provides a battery separator laminate comprising a continuous layer of electrolyte-resistant fibers preferably containing an anti-static agent such as mineral oil attached only at selected points to a base layer of an electrolyte-resistant — resin-impregnated fibrous mat. The present invention also provides an economical method of making such a separator.

BRIEF DESCRIPTION OF THE DRAWINGS

FIG. 1 is a plan view of the battery separator product of the present invention.

FIG. 2 is an end view of the product illustrated in FIG. 1.

FIG. 3 is a schematic of the novel process used to make the battery plate separator product of the present invention.

FIG. 4 is a perspective view of a typical multi-cell wet battery cut away to show the battery separator product of the present invention installed against one of the plates therein.

FIG. 5 is a side view of a typical multi-cell wet battery partially cut away to show the installation of the battery separator product of the present invention installed around one of the battery plates.

FIG. 6 is a cross section along lines 6—6 in FIG. 5 showing the battery separator in place around a battery plate immediately after installation of the separators.

DETAILED DESCRIPTION AND PREFERRED EMBODIMENTS

As shown in FIGS. 1 and 2 the retainer mat 2 of the present invention is made up of a continuous layer 4 of loosely matted fibers attached at selected points 6 to a resin-bonded fibrous mat 8.

The continuous layer of loosely matted fibers 4 can comprise any fibers that are essentially inert in the electrolyte in which they will be exposed. The fibers have diameters sufficiently small and the thickness of the layer is sufficiently thick to act as a barrier to harmful particles suspended in the electrolyte and to the particles of battery paste that may be present on the battery plate. Among the materials suitable as fibers for the continuous layer are glass fibers, ceramic fibers, and high molecular weight synthetic fibers such as polypropylene. Acid-resistant glass fibers having a composition meeting the criteria of C glass and having diameters equal to or less than about 13 microns are preferred, e.g. 11–13 microns.

The continuous layer of loosely matted fibers 4 can vary in thickness depending on the environment in which it must operate. Typical thicknesses will range between about one-sixteenth inch and about one-half inch. The fibers should be sufficiently physically innertangled so that the layer can be physically handled without tearing apart or deteriorating. Such a layer would not require any binder, however, a small amount of binder compatible with the electrolyte could be used if desired. It is desirable, both in the manufacturing of continuous layer 4 as well as in the process of making the retainer mat of the present invention, to include in layer 4 a small amount of an antistatic agent to prevent the fibers from clinging to surfaces coming in contact therewith.

In the preferred embodiment the continuous layer 4 is a layer of sliver made up of acid-resistant glass fibers having diameters of about 11–13 microns and containing about 1.5% mineral oil to enhance the integrity of the layer and to provide an anti-static property. The thickness of the continuous layer of sliver is about one-half inch in its uncompressed form and weighs about 28 grams per linear foot in widths of about 5.5–6 inches.

Sliver is well known and is produced from molten glass which is pulled from small orifices in a ceramic-nobel metal crucible. To make a sliver mat the resultant fibers are gathered continuously to form a loose jack-straw arrangement and passed between two soft rollers which press the fibers into a loose mat approximately 6 inches wide and about one-half inch thick. Sliver is commonly used to decorate Christmas trees and other Christmas scenes simulating an effect of snow and/or ice.

The resin-bonded fibrous mat 8 can be made from any fiber that is essentially inert to the electrolyte in which it is to be used and includes the materials mentioned above for use in making the fibers for the layer 4. These fibers can be first woven and then bonded together or simply overlapped and bonded together using a resinous binder that is preferably essentially inert to the electrolyte in which it is to be used.

In the preferred embodiment, the resin-bonded fibrous mat 8 consists of chemical grade glass fibers having diameters of about 11–14 microns arranged in a jack-straw configuration and bonded together with about 5 to about 20% by weight of a resinous binder. The thickness of this mat can range from about 0.01 inches to about 0.03 inches with the weight of a 0.03 inch thick mat being about 1.95 lbs./hundred sq. ft. Various binders could be used such as styrene, urea formaldehyde and acrylic resins. The preferred binder is a composition containing 2,100 lbs. of water, 100 lbs. of a 45% solids acrylic emulsion available from Rohm and Haas under the designation of HA-16, and 25 milliliters of well known anti-foam agents such as the solution available from Dow-Corning identified as Antifoam B. The resin-bonded fibrous mat 8 can be produced by the process disclosed in U.S. Pat. No. 3,235,913 which disclosure is herein incorporated by reference. This process is just one of many suitable processes known in the art for making a resin-bonded fibrous mat of the type described above.

The attachments 6 can be either permanent or temporary, i.e. the attachment means can be either essentially inert to the electrolyte or can be dissolved by the electrolyte providing that the electrolyte is not significantly affected by such dissolution. The attachments can be either continuous or discontinuous and can be either oriented or randomly placed over the interface. For example, the attachments can comprise continuous strips or small areas of adhesive, stitching, rivets or rivet-like fasteners or any other known fastening means compatible with the electrolyte so long as said fastening means do not protrude excessively above the exposed surfaces of layers 4 and 8.

In the preferred embodiment, the attachments 6 are formed by stitching the component layers together using a monofilament thread, such as nylon, for soluble systems and continuous filament C glass thread for insoluble systems. The stitches shown in FIGS. 1 and 2 are continuous and oriented in parallel directions spaced apart at selected distances. Since the stitching is merely to hold the two component layers 4 and 8 together the type of stitch used, the spacing between stitches, and whether the stitching is continuous or discontinuous, or oriented or at random is largely a matter of choice and within the skill of the art to determine for each particular application. As shown in FIG. 2, stitching of the layer 4 to layer 8 results in compression of layer 4, particularly at the points of attachment 6, producing a pillowing effect between the points of attachment. The advantage of using a stitching attachment that is soluble in the electrolyte is that when the soluble stitches dissolve in the electrolyte the attachment is removed allowing the compressed portions of layer 4 to expand back to at least a portion of their original thickness providing a continuous contact with the battery plate surface. The advantage of using stitching as attachment 6 compared with adhesive exists primarily in less expense and trouble in storing and applying the stitching as compared to storing and applying an adhesive.

An economical process used to make the battery plate retainer mat 2 is illustrated in schematic form in FIG. 3. A roll 10 of sliver layer 4 of desired width, thickness and density is mounted on axle 9 and unrolled around roller 14 to feed layer 4 between rollers 18 and 20 which serve to align and contact sliver layer 4 with glass mat layer 8 which has been similarly unrolled from roll 12 mounted on axle 11 around roller 16. The aligned and contacted layers 4 and 8 are then fed to a conventional stitching device 22 which is capable of providing the stitching pattern desired. For example, the stitching means 22 would have five stitching heads spaced at desired intervals across the width of the advancing composite to produce the stitching pattern shown in the product illustrated in FIG. 2. The stitching means shown in FIG. 3 comprises a spool of thread 24 and thread guides for guiding the thread to needle 26, drive means for reciprocally driving the needle and thread through the advancing composite and bobbin and support means 28.

Although stitching means are shown as forming the attachment in FIG. 3, it should be understood that stitching means 22 could be replaced by an adhesive distributing an applying means located at a point between either of rolls 10 or 12 and either of rolls 18 or 20 for applying adhesive to either layer 4, layer 8 or both in a selected pattern. In this alternative embodiment rolls 18 and 20 would then perform the additional function of pressing layers 4 and 8 together in an adhering manner.

The advancing attached composite 30 is next cut into desired lengths by any suitable cutting means such as a reciprocating blade cutter 32 shown in FIG. 3. The cut lengths 2 can be further trimmed, if desired, to fit any battery plate configuration. It is preferred to make the battery plate retainer mats in the width of the plates that they are to separate and then cut to the proper lengths to avoid any necessity for further trimming. It is possible, however, to eliminate cutting means 32 and to simply roll the attached composite layer 30 into a roll or other shape for shipment to users where it would then be cut to the desired shapes.

FIGS. 4–6 illustrate a typical use of the battery plate retainer mat of the present invention. FIG. 4 shows a typical multi-cell wet battery with its top and most of one end cut away to show the interior battery plates and one battery plate retainer mat 2 installed therein. For the sake of brevity, only one battery plate retainer mat is illustrated in FIG. 4 since to show more would be repetitious. The battery shown in FIG. 4 comprises the outside casing 40 and interior battery plates 42 and 44. The battery plate retainer mat 2 is installed in contact with battery plate 44 in such a manner that the continuous fibrous layer 4 is in contact with plate 44. In the installation shown in FIG. 4 the stitches 6 are oriented in a vertical direction, however, this is largely a matter of choice, particularly when soluble attachments are used. As shown in FIG. 5 a typical installation would be to place a battery plate retainer mat 2 on each side of a battery plate in such a manner that the continuous fibrous layer 4 is in contact with the face of the plate or the battery paste coating thereon. This is best illustrated in FIG. 6 which is a cross-sectional view along lines 6–6 of FIG. 5. In FIG. 5 element 46 represents spaced-apart ridges running along the inside surface of the bottom of outer case 40 on which the battery plates rest.

When soluble attachments are used, they are dissolved shortly after the electrolyte is added to the battery. Since the continuous fibrous layer 4 is in a compressed state due to the attachments, when the attachments are dissolved layer 4 expands back against the plate 44 to provide a continuous contact over the entire surface of plate 44. Of course, if insoluble attachments were used the configuration remains essentially as shown in FIG. 6 except when the attachments are spots or stips of adhesive. When adhesive attachments are used, the continuous fibrous layer 4 is not in a compressed state and therefore would be in continuous surface contact with plate 44 immediately after installation.

The manner of using the battery plate retainer mat illustrated and described here is only one of several possible manners in which the battery plate retainer mat of the present invention may be installed in a battery. For example, the retainer mat can be cut to sufficient lengths to permit the mat to extend down the face of a plate, wrap under or over an end of the plate and up the opposite face. The thicknesses of the various layers, the manner of installation, and whether soluble or insoluble attachments are used will depend upon the sizes and requirements of the battery, the types of electrolyte used, and the particular practices of the battery manufacturers.

What is claimed is:

1. A battery plate retainer mat or separator consisting essentially of:
   a. a first continuous electrolyte permeable layer of matted electrically insulative and electrolyte resistant fibers and containing essentially no binder materials;
   b. a second electrolyte-permeable layer of electrolyte resistant fibers bound together with a binder;
   c. said first layer being attached to said second layer such that a major surface of said first layer contacts a major surface of said second layer, with attachments selectively spaced over at least one of the major surfaces of said first and second layers whereby only portions of said first layer are attached to adjacent portions of said second layer.

2. The article of claim 1 wherein said second layer is higher in density, stronger, and thinner than at least the unattached portions of said first layer.

3. The article of claim 2 wherein the diameters of the fibers in said first layer and the thickness of said first layer are sufficient to act as a barrier to particles of battery plate paste and particles frequently present in the electrolyte of a functioning wet-cell battery.

4. The article of claim 3 wherein the diameters of the fibers in said first layer are less than about 13 microns.

5. The article of claim 4 wherein the fibers in said first layer comprise material selected from the group consisting of natural and synthetic organic materials, glasses, ceramic materials and combinations thereof.

6. The article of claim 5 wherein the fibers in said first layer comprise material selected from the group consisting of polypropylene, chemical grade glass, alumina, alumina-silica and combinations thereof.

7. The article of claim 5 wherein said first layer contains an effective amount of an anti-static agent.

8. The article of claim 7 wherein the antistatic agent is mineral oil.

9. The article of claim 1 wherein the thickness of said second layer is within the range of about 0.01 to about 0.030 inches.

10. The article of claim 9 wherein the fibers in said second layer comprise material selected from the group consisting of natural and synthetic organic materials, glasses, ceramic materials and combinations thereof.

11. The article of claim 10 wherein the fibers in said second layer comprise material selected from the group consisting of polypropylene, chemical grade glass, alumina, alumina-silica and combinations thereof.

12. The article of claim 9 wherein said second layer contains an effective amount of binder within the range of about 5 to about 20% by weight.

13. The article of claim 12 wherein said binder is selected from the group consisting of styrene resins, acrylic resins, urea formaldehyde resins and combinations thereof.

14. The article of claim 1 wherein the attachments are soluble in an electrolyte.

15. The article of claim 14 wherein the attachments are stitches.

16. The article of claim 15 wherein the stitches comprise threads of a synthetic resin.

17. The article of claim 1 wherein the attachments are spots or strips of adhesive, said adhesive being essentially not deteriorated by an electrolyte.

18. A battery plate retainer mat or separator consisting essentially of:
   a. a first continuous electroylyte-permeable layer of matted electrolyte resistant and electrically insulating fibers having diameters of less than about 13 microns, said first layer being sufficiently thick to act as a barrier to particles of a battery plate paste and to particles frequently present in an electrolyte of a functioning wet-cell battery and being essentially free of a binder material;
   b. a second electrolyte-permeable layer of electrolyte resistant fibers, said second layer having a thickness of up to about 0.03 inches, the fibers in said second layer being bonded together with a binder that is essentially non-deteriorated by an electrolyte;
   c. said first continuous layer being attached to said second layer only by spaced attachments, said attachments being stitches, said first layer being attached to said second layer such that a major surface of said first layer is in contact with a major surface of said second layer.

19. The article of claim 18 wherein said first layer and said second layer contain chemical grade glass fibers.

20. The article of claim 19 wherein said first layer contains an effective amount of an anti-static agent.

21. The article of claim 19 wherein said stitches are soluble in an electrolyte.

22. The article of claim 18 wherein said first layer and said second layer contain synthetic resin fibers.

23. A method of making a battery plate retainer mat or separator consisting essentially of:
   a. providing a first continuous electrolyte permeable layer of electrically insulative and electrolyte resistant fibers and containing essentially no binder;
   b. providing a second layer of electrolyte resistant fibers, said fibers being bonded together with a binder;
   c. aligning said first layer with said second layer and bringing said first and second layers together so that a major surface of said first layer contacts a major surface of said second layer;
   d. attaching said first layer to said second layer with spaced-apart attachments to form a layered composite.

24. The method of claim 23 further comprising cutting said layered composite to a desired size.

25. The method of claim 24 wherein said layered composite is only cut transverse to the length thereof.

26. The method of claim 23 wherein the attaching step is achieved by stitching said first layer to said second layer with a material that is soluble in a conventional battery electrolyte.

27. The method of claim 23 wherein an adhesive is applied to spaced-apart areas of at least one of said major surfaces before said first and second layers are brought together.

28. A battery containing electrolyte and plates therein and further containing at least one battery plate retainer mat or separator as claimed in claim 18 having the first continuous fibrous layer in contact with either a battery plate or a layer of battery paste thereon.

* * * * *